Patented July 8, 1952

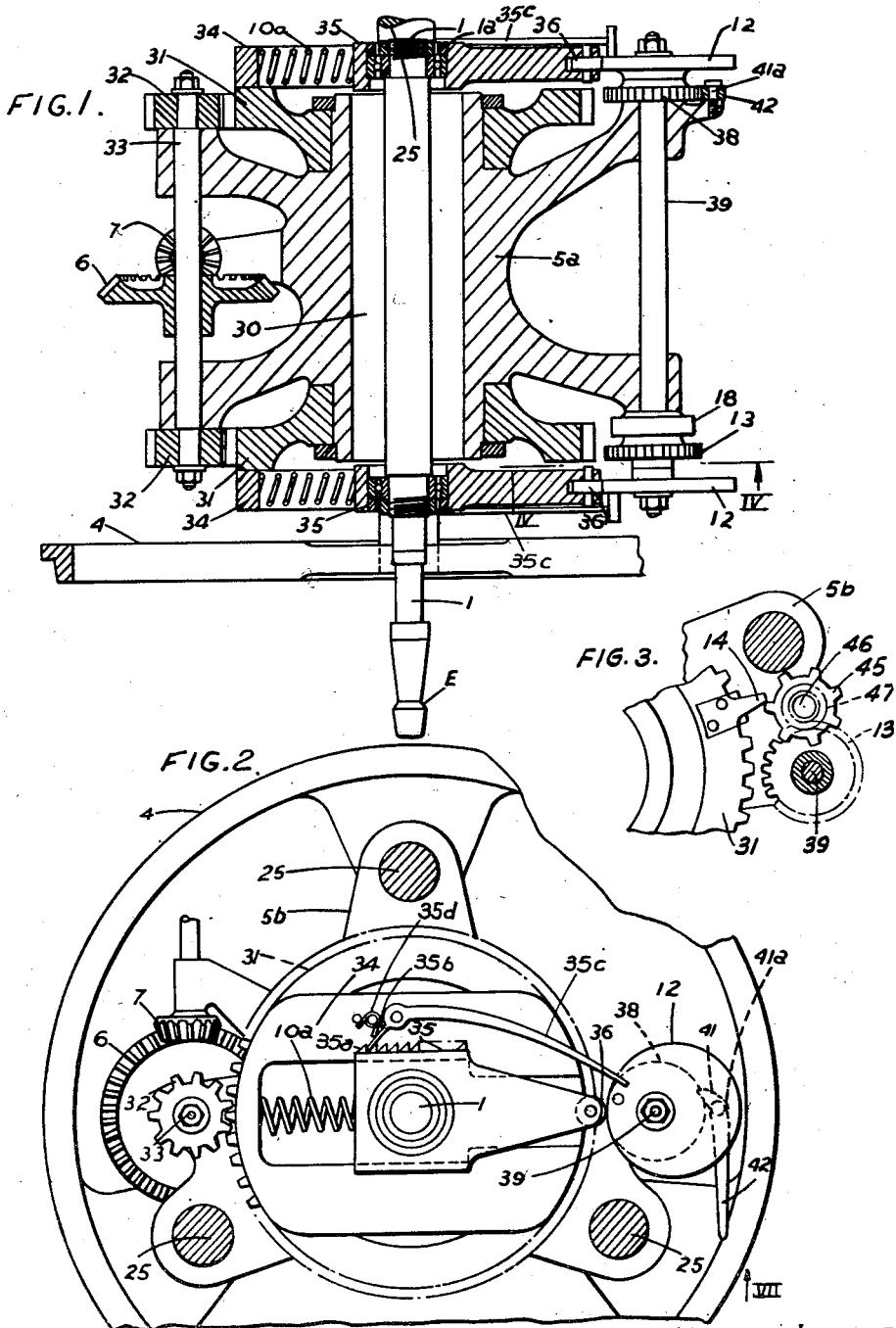

2,602,270

UNITED STATES PATENT OFFICE 2,602,270

APPARATUS FOR FORMING UNDERCUT SOCKETS IN A MATERIAL IN A HOT PLASTIC STATE

John Edward Wilcock, St. Helens, and Granville Hugh Baillie, London, England, assignors to Pilkington Brothers Limited, Liverpool, England, a British company Application August 6, 1947, Serial No. 766,630
In Great Britain July 13, 1945

Section 1, Public Law 690, August 8, 1946
Patent expires July 13, 1965

3 Claims. (Cl. 49—22)

This invention relates to apparatus for forming undercut sockets in a glass body in a hot plastic state.

In the manufacture of high voltage glass insulators, the glass is moulded between two complemental moulding members to give the desired dished plate form to the glass and centrally of the plate a deep socket. The socket has tapered walls which are slightly wider at the mouth than at the base, to facilitate separation of the moulding members.

To complete the insulator a steel pin is cemented into the socket, and to form a load bearing shoulder in the socket, and to interlock the pin and socket, when the cement is packed in the socket about the pin, the socket is widened below the mouth to convert the tapered socket into an undercut socket thus providing a load bearing shoulder just below the mouth.

This outward deformation of the socket wall below the mouth has heretofore been effected by a hand operation, using a forming stick the forming end of which is rotated in a more or less circular path while being pressed radially against the glass. The process of deformation can be regulated by the operator only by his applying a pressure against the glass which is not so great as to cause folds in the glass and yet is great enough to complete the operation before the glass has cooled to a point where deformation is difficult.

However skilled the operator may be in applying a definite and constant pressure, the process gives unsatisfactory results by reason of the inevitable variations in the temperature of the glass. Such temperature variations call for corresponding variations in the pressure, and these cannot be estimated by the operator.

The main object of the invention is to provide an apparatus for effecting the formation of the socket wall by a predetermined rate of deformation, instead of by application of a predetermined pressure.

Another main object of the present invention is to provide automatic means of controlling the movements of a forming stick, whereby malformations in undercut sockets of glass insulators is avoided, and a standard form of product produced.

Apparatus according to the invention comprises a pair of members rotatable about the axis of a socket and spaced apart in an axial direction, a forming stick free to turn about its own axis, a movable piece mounted on each said member and engaging said stick to move the forming stick progressively from the centre line of a socket outwardly, and means for moving each said piece relatively to the respective rotatable member during rotation of the latter, whereby the forming end of the stick is moved in a predetermined path of increasing radii in rolling contact with the wall of a socket.

Socket deforming apparatus according to the invention is preferably incorporated in a machine for pressing the glass insulator from a gob.

In order that the invention may be more clearly understood a preferred embodiment thereof will now be described with reference to the accompanying drawings in which:

Figures 1 and 2 show in fragmentary elevation and plan respectively a socket forming apparatus according to the invention.

Figure 3 is a detail underside view taken on the line IV—IV of Figure 1.

In the drawings like references designate the same or similar parts.

The apparatus about to be described comprises an alternate form of forming apparatus to that described in co-pending application S. N. 729,332 in which said application there is described the formation of an insulator manufactured from glass in a hot plastic state. The insulator lies in a bottom mould and a locating or cushioning ring for the forming stick operating apparatus is disposed on the mould.

For the sake of brevity only the stick operating apparatus according to the present invention will be described herein.

Referring to the drawings, the forming stick 1 having a lead shoulder E to form a shoulder in a socket wall is arranged to remain parallel to the axis of a socket during the deforming operation. A lower cage part 4 is provided and a frame 5a is formed with a central hollow housing 30, permitting lateral displacement of the stick to the desired extent. Toothed wheels 31 are adapted to turn on the housing above and below and are driven by pinions 32 on a shaft 33, driven by the bevel gears 6, 7. The frame 5a terminates below in a spider 5b which is fixed to the ring 4 by rods 25.

Each toothed wheel 31 carries for rotation therewith a slotted member 34 in which a block 35 is adapted to slide. The stick 1 is mounted in the blocks 35 by ball bearings 1a. Each block 35 carries a roller 36 which is urged against a rotatable cam 12 by spring 10a and one side of each block 35 is formed with ratchet teeth 35a with which a pawl 35b normally engages through the pressing action of a spring 35d, This pawl 35b has a long tail 35c which when moved manually, clockwise as viewed in Fig. 2, frees the blocks 35 so that the blocks return to pristine position under the action of the springs 10a. At this time angular movement of the toothed wheels 31 is stayed and the tails 35c are retained in depressed position until the cams 12 are returned to starting position as described below.

The two cams 12 are fixed on a shaft 39 journalled in the frame 5a, and the shaft 39 carries a ratchet wheel 38, a gear wheel 13 and a clock spring 18. The cam shaft 39 is actuated step by step at each revolution of the wheels 31 by a projection 14 on the lower wheel 31 (Figure 3), which engages a toothed wheel 45 pivoted on a stud 46 and carrying a pinion 47 which engages the gear wheel 13. As the cam shaft is turned, the spring 18 is wound up, and the shaft is prevented from turning back by a spring pressed pawl 41 pivoted to the frame at 41a and engaging the ratchet wheel 38. The pawl 41 is provided with a handle 42.

In operation, the toothed wheels 31 are rotated, turning the cams 12, which displace the blocks 35, with the stick 1. After the desired total displacement, the handle 42 is moved to release the cam shaft 39, and the clock spring 18 then turns back the cams to their starting position, after which operation of tails 35c releases blocks 35 so that the stick centralizes itself.

When the apparatus disclosed is arranged at a station on a machine for pressing the insulator from a gob, the frame 5a, provided with an air cylinder as just described, is operated in synchronism with the usual pressing upper mould part, and the lower moulds will then be mounted in a table rotated step by step in known manner to bring each mould successively to the gob feeding, pressing, socket-deforming, and cooling stations.

Thereby a high tension glass insulator may be produced ready for the insertion of the usual steel pin by entirely automatic means, and a standard product produced. However, the apparatus herein described may be comprised in an individual machine and a hot pressing transferred in the usual manner to a mould comprised in the machine and the parts 4, 5a may be moved mechanically e. g. by hand lever or by compressed air, operating e. g. in a cylinder as described above and as will be well understood by those skilled in the machine building art.

By employing a mechanically driven driving member which positively controls rotation of the stick the latter is always driven with a constant effort and the rate of deformation of the glass is regulated at all times so as to prevent ploughing in the glass and skidding is avoided by enabling the stick to make rolling contact with the glass. Moreover the stick is operated when the glass is at a temperature for the glass which is practically speaking the temperature of pressing, thereby the formation of the lead carrying shoulder is effected under optimum conditions.

By the present invention high voltage glass insulators of standard form can be produced, in particular having a deformed socket of accurately dimensioned form, thereby facilitating the assembly of the usual steel pins in the sockets of the insulators.

We claim:

1. Apparatus for forming an undercut socket in a glass body in a hot plastic state, comprising a pair of members rotatable about the axis of a socket and spaced apart in an axial direction, a forming stick free to turn about its own axis by rolling contact with the wall of a socket, a movable piece mounted on each said member for movement therewith and diametrically thereof and supporting said stick to move the forming stick progressively from the centre line of a socket outwardly, and means for moving each said piece diametrically of the respective rotatable member during rotation of the latter, whereby the forming end of the stick is moved in substantially circular paths of successively increasing radii.

2. Apparatus for forming an undercut socket in a glass body in a hot plastic state, comprising a pair of members rotatable about the axis of a socket and spaced apart in an axial direction, a forming stick free to turn about its own axis by rolling contact with the wall of a socket, a movable piece mounted on each said member for movement therewith and diametrically thereof and supporting said stick for free rotation about its axis, resilient means to urge said movable pieces to a starting position, means for moving said pieces diametrically of said members during rotation of the latter to move the forming stick stepwise progressively from the axis of a socket outwardly against said resilient means, whereby the forming end of the stick is moved in substantially circular paths of successively increasing radii, and latching means to retain said movable pieces in each successive stepwise position.

3. Apparatus for forming an undercut socket in a glass body in a hot plastic state, comprising a pair of members rotatable about the axis of a socket and spaced apart in an axial direction, a forming stick free to turn about its own axis, by rolling contact with the wall of a socket, a movable piece mounted on each said member for movement therewith and diametrically thereof and supporting said stick for free rotation about its axis, resilient means to urge said movable pieces to a starting position, means for moving said pieces diametrically of said members during rotation of the latter to move the forming stick stepwise progressively from the axis of a socket outwardly against said resilient means, whereby the forming end of the stick is moved in substantially circular paths of successively increasing radii, a toothed rack integral with each movable member, a pivoted pawl for each rack, and a spring to urge a pawl into engagement with the teeth of its associated rack to retain the movable piece in the positions to which it is moved stepwise.

JOHN EDWARD WILCOCK.
GRANVILLE HUGH BAILLIE.

REFERENCES CITED

The following references are of record in the file of this patent:

UNITED STATES PATENTS

| Number | Name | Date |
|---|---|---|
| 1,553,356 | Bennett | Sept. 15, 1925 |
| 1,567,027 | Bennett | Dec. 29, 1925 |

FOREIGN PATENTS

| Number | Country | Date |
|---|---|---|
| 596,019 | Great Britain | Dec. 24, 1947 |